United States Patent [19]

Meyer, Jr.

[11] Patent Number: 4,958,286

[45] Date of Patent: Sep. 18, 1990

[54] TIME-VARIANT FILTER COEFFICIENTS

[75] Inventor: Wallace H. Meyer, Jr., Bellaire, Tex.

[73] Assignee: Western Atlas International, Inc., Houston, Tex.

[21] Appl. No.: 212,345

[22] Filed: Jun. 27, 1988

[51] Int. Cl.$^5$ .............................................. G01V 3/18
[52] U.S. Cl. .................................. 364/422; 324/338; 324/339; 73/151
[58] Field of Search ................ 364/422; 324/338, 339; 73/151, 151.5

[56] References Cited

U.S. PATENT DOCUMENTS

| | | | |
|---|---|---|---|
| 3,056,917 | 10/1962 | Tanguy | 324/1 |
| 3,147,429 | 9/1964 | Moran | 324/6 |
| 3,179,879 | 4/1965 | Tanguy | 324/6 |
| 4,302,722 | 11/1981 | Gianzero | 324/339 |
| 4,467,425 | 8/1984 | Schaefer et al. | 364/422 |
| 4,471,436 | 9/1984 | Schaefer et al. | 364/422 |
| 4,499,421 | 2/1985 | Sinclair | 324/339 |
| 4,499,422 | 2/1985 | Sinclair | 324/339 |
| 4,513,376 | 4/1985 | Barber et al. | 364/422 |
| 4,604,581 | 8/1986 | Thadani et al. | 324/339 |
| 4,720,681 | 1/1988 | Sinclair | 324/339 |
| 4,780,679 | 10/1988 | Kenyon et al. | 324/338 |
| 4,800,496 | 1/1989 | Barber et al. | 364/422 |

OTHER PUBLICATIONS

Doll, "Introduction to Induction Logging and Application to Logging of Wells Drilled With Oil Base Mud," *Petroleum Transctions* (Jun. 1949) at 148-162.

Moran & Kunz, "Basic Theory of Induction Logging and Appplication to Study of Two-Coil Sondes," *Geophysics* (Dec. 1962) at 829-858.

Primary Examiner—Jerry Smith
Assistant Examiner—Kim Thanh Bui
Attorney, Agent, or Firm—David S. Wise

[57] ABSTRACT

There is disclosed herein an improved method for processing the output signals from the receiver coil of an induction logging tool to account for nonlinear attenuation and phase shift of the induced electromagnetic field in the subsurface formation as a function of formation conductivity. The method includes the calculation of a modified vertical geometrical factor at a plurality of sample intervals for each measure point. The vertical geometrical factor is modified at each sample interval according to an attenuation factor that is a function of the distance in skin depths between the sample interval and the measure point. Using the modified vertical geometrical factor at each sample interval, an approximation for the measured signal in the receiver coil at the measure point is calculated and compared to the skin-effect corrected conductivity at that point to obtain an improved approximation of true formation conductivity at the measure point.

20 Claims, 4 Drawing Sheets

TIME-VARIANT FILTER COEFFICIENTS

BACKGROUND OF THE INVENTION

The present invention relates to electrical induction logging systems for predicting the nature and characteristics of subsurface formations penetrated by a borehole. More particularly, the present invention relates to an improved method for processing electrical signals generated by an induction logging tool, or sonde, to obtain an accurate assessment of the conductivity of the various subsurface formations. Still more particularly, the present invention relates to an improved method for processing the measured signal induced in the receiver coil of the sonde to account for nonlinear variations in the measured signal as a function of variations in the conductivity of formations within a predetermined distance from the sonde.

The production of hydrocarbons from subsurface formations typically commences by forming a borehole through the earth to a subsurface reservoir thought to contain hydrocarbons. As drilling progresses, various physical, chemical, and mechanical properties are "logged" for the purpose of determining the nature and characteristics, including for example, the porosity, permeability, saturation, and depth, of the subsurface formations encountered. One such logging technique commonly used in the industry is referred to as induction logging. Induction logging measures the conductivity or its inverse, the resistivity, of a formation. Formation conductivity is one possible indicator of the presence or absence of a significant accumulation of hydrocarbons because, generally speaking, hydrocarbons are relatively poor conductors of electricity. Formation water, on the other hand, typically salty, is a relatively good conductor of electricity. Thus, induction logging tools can obtain information that, properly interpreted, indicates the presence or absence of hydrocarbons.

U.S. Pat. Nos. 3,056,917; 3,147,429; and 3,179,879 illustrate typical prior-art tools that operate according to the basic principles of induction logging. The downhole tool comprises a transmitter coil and a separate receiver coil wound about a nonconductive mandrel and spaced apart coaxially. A signal generator connected to the transmitter coil produces an alternating current of constant amplitude and frequency within the transmitter coil. The flow of alternating current in the transmitter coil induces a magnetic field within the surrounding formation, causing the flow of eddy currents within the formation circumferentially about the axis of the tool. The eddy currents, in turn, induce a magnetic field that is coupled to the receiver coil, thereby inducing in the receiver coil a voltage signal with magnitude and phase dependent upon the electrical characteristics of the adjacent formation. U.S. Pat. No. 4,302,722 discloses a two-coil tool wherein the transmitter and receiver coils are disposed with their axes generally perpendicular to the borehole axis, for the purpose of facilitating vertical conductivity measurements.

Typically, the signal from the receiver coil is applied to one or more phase detection circuits, each of which generates a signal proportional to the magnitude of that component of the receiver coil signal having a particular, predetermined phase. Thus, one such phase detector circuit senses the magnitude of the component of the receiver coil signal that is in-phase with the transmitter current in the transmitter coil. This component signal is commonly referred to as the real or in-phase (R) component. A second phase detection circuit commonly used in induction logging tools detects the component of the receiver coil signal that is 90 degrees out of phase with the transmitter current. This latter component signal is commonly referred to as the quadrature-phase (X) component signal. Measurement of the R and X phase component signals is well known in the art, as disclosed, for example, in U.S. Pat. Nos. 3,147,429; 4,467,425; and 4,471,436. U.S. Pat. Nos. 4,499,421; 4,499,422; and 4,720,681 disclose more recent apparatus particularly adapted for measuring accurately the R and X signals.

Because the output signal from the receiver coil is not itself an absolute measure of conductivity, but rather is proportional to the true formation conductivity, the output signal must be processed to obtain a log or plot of true formation conductivity as a function of axial depth in the borehole. Most modern theoretical analysis of induction log processing is based upon the work of H. G. Doll, which is summarized in an article, "Introduction to Induction Logging and Application to Logging of Wells Drilled With Oil-Base Mud," published at pages 148–162 in the June 1949 issue of *Petroleum Transactions*. According to Doll's analysis, the in-phase component of the signal induced in the receiver coil is directly proportional to the conductivity of the surrounding formation, and the constant of proportionality, referred to by Doll as the "geometrical factor," is a function of the geometry of the tool as it relates to the portion of the formation being measured.

Doll calculated what he termed the "unit geometrical factor," which defines the relationship between the conductivity of a so-called "unit ground loop," a horizontal loop of homogeneous ground having a circular shape with its center on the axis of the borehole and having a very small, square cross section, and the elementary voltage signal contributed by the unit ground loop to the total in-phase signal induced in the receiver coil. By integrating the unit geometrical factor across all unit ground loops lying within a horizontal plane spaced at some axial distance z from the center of the coil system, Doll obtained the geometrical factor for a "unit bed." A plot of this geometrical factor as a function of the axial distance from the center of the coil system gives what is commonly referred to as the "vertical geometrical factor" for the tool. It is an accurate plot of the sonde response function relating formation conductivity to output voltage measurements for the tool, assuming no attenuation or phase shift of the induced magnetic field as a consequence of the conductivity of the surrounding formation.

When the formation surrounding the tool is conductive, the electromagnetic field penetrating the formation is attenuated as a consequence of resistive losses through eddy currents induced by the electromagnetic field within the conductor. This "skin effect" tends with increasing conductivity to diminish the magnitude of the in-phase component signal induced in the receiver coil. Thus, in highly conductive formations, the sonde response function relating formation conductivity to measured output signal in the receiver coil is not strictly a function of tool and formation geometry, i.e., the vertical geometrical factor of the tool, but is also a function of the conductivity of the formation. The relationship of the skin-effect phenomenon to the analysis of induction logs is discussed at some length in an article by J. H. Moran and K. S. Kunz, entitled "Basic Theory of Induction Logging and Application to Study of Two-Coil Sondes," published at pages 829-858 of the December 1962 issue of Geophysics (the "Moran article"). In addition, the skin-effect phenomenon is discussed in some detail in U.S. Pat. No. 3,147,429, issued to J. H. Moran, which is hereby incorporated by reference.

The Moran article discloses that the magnitude of the skin effect phenomenon is a complex function of the coil system operating frequency, the spacing between the transmitter and receiver coils, and the conductivity of the adjacent formation material. The article also discloses that the variations introduced by the operating frequency and the conductivity are not linear, which makes it particularly difficult to account for their effects on the sonde response function. By selective choice of operating frequency and coil length, the effect of the skin-effect phenomenon can be minimized or substantially eliminated for a large range of formation conductivity values. See, e.g., U.S. Pat. No. 4,604,581. In many instances, however, these limitations place restraints on the logging system that are not acceptable. Accordingly, for a significant proportion of induction logging activity, it is necessary to account accurately for the nonlinear variations in sonde response function as a consequence of the conductivity of the adjacent formation material.

The Moran article and the Moran patent disclose that the magnitude of the quadrature-phase (X) component of the receiver coil signal gives an approximation of the skin-effect phenomenon. Thus, the Moran patent assumes that the vertical geometrical factor accurately relates the true formation conductivity to the in-phase component of the receiver coil signal for zero conductivity. As conductivity increases, more of the current induced in the receiver coil is phase-shifted and attenuated as a consequence of the skin effect and the magnitude of the in-phase component of the receiver coil signal is diminished as the magnitude of the quadrature-phase component of the receiver coil signal increases. According to the Moran patent, the magnitude of the quadrature-phase component is approximately equal to the magnitude of the skin-effect losses to the in-phase signal. Thus, the Moran patent corrects for the skin-effect phenomenon by adding the real component of the quadrature-phase signal to the real component of the in-phase signal to obtain a measure of the apparent conductivity, which is related to the true formation conductivity by the vertical geometrical factor.

The approach adopted by the Moran patent to account for the skin-effect phenomenon represents a relatively crude approximation based on several assumptions. One such assumption is that the adjacent formation material is homogeneous, with little or no variation in conductivity. Thus, where the formation being measured is a relatively thin bed and the adjoining beds vary significantly in conductivity, Moran's approach would not account accurately for the spacial variations in formation conductivity and their effect on the signal measured in the receiver coil. Likewise, where the adjacent formation is significantly invaded by drilling mud having a conductivity substantially different from that of the invaded formation material, Moran's approach again would not account accurately for the spacial variations in the conductivities. Accordingly, it is necessary in processing the output signal from the receiver coil of an induction logging tool not only to account for the effect of conductivity on the output signal but also to account for variations in conductivity from all parts of the surrounding formation that contribute to the measured signal at any particular axial position within the borehole.

U.S. Pat. Nos. 4,467,425 and 4,471,436 (Schaefer, et al.), which are hereby incorporated herein by reference, disclose more recent efforts to correct for variations in the output signal measured in the receiver coil due to spacial variations resulting from the skin-effect phenomenon. Based on the work of Doll and Moran, Schaefer, et al. derive an expression for the conductivity signal in the receiver coil, assuming no skin effect, as being the convolution of true formation conductivity with a forward transfer function equivalent to the vertical geometrical factor (or sonde response function) for the sonde. The forward transfer function then is modified by means of Fourier analysis to account for changes due to spacial variations in formation conductivity to obtain a spacial domain system response function that maps true formation conductivities into the measured voltages obtained by the sonde. Thus, an approximation of true formation conductivity is obtained by deconvolving the measured signal in the receiver coil with the modified system response function for the sonde.

Schaefer, et al. focus on two problems associated with variations in formation conductivity. The first, or "shoulder effect," is the skew in measured conductivity data for a thin bed of relatively low conductivity caused by eddy currents flowing in adjacent beds having relatively higher conductivities. The unwanted contributions from the adjacent beds result in a measured conductivity in the target thin bed somewhat higher than true. The second problem addressed by Schaefer, et al. is the skin effect phenomenon resulting from attenuation and phase shift of the induced electromagnetic field with increasing conductivity of the formation, as described above.

To compensate for the shoulder effect, Schaefer, et al. construct in the spacial frequency domain a truncated, linear time-invariant filter having a limited frequency response that suppresses signal contributions beyond a predetermined cutoff frequency. The particular filter disclosed is a type of finite-duration, impulse response filter known as a Kaiser window function. By convolving the inverse Fourier transform of this linear filter with the in-phase component of the sonde transfer function at a given conductivity, Schaefer, et al. suppress unwanted conductivity contributions from adjacent beds without affecting the shape of the sonde transfer function within the axial span of the thin bed.

To compensate for the skin-effect attenuation of the in-phase component of the measured voltage in the receiver coil, Schaefer, et al. construct an adaptive spacial filtering function that, when convolved with the quadrature-phase component of the sonde response function, gives an approximation of the magnitude of the skin-effect attenuation. Construction of the adaptive filtering function comprises a two-step process. First, the normalized average of two finite impulse response filters at two separate conductivities is applied to the quadrature-phase component of the sonde response function at all conductivities to fit the quadrature-phase component of the sonde response function to the shape of a function that maps formation conductivity into the real part of the skin-effect error signal. The skin-effect error signal comprises the difference between the real component of the sonde response function at zero conductivity and the in-phase component of the measured conductivity signal. Next, a boosting function is constructed to adjust the magnitude of the transformed quadrature-phase component of the sonde response function to the magnitude of the function that maps formation conductivity into the real part of the skin-effect error signal. This boosting function comprises the ratio of the skin-effect error signal to the quadrature-phase component of the measured conductivity signal. When the boosting function has been computed for all conductivities, the values are curve-fitted to obtain the function that best fits the quadrature-phase component of the sonde response function to the skin-effect error function that maps formation conductivity into the real part of the skin-effect error signal.

U.S. Pat. No. 4,604,581 (Thadani, et al.) discloses various techniques for adapting the tool operating frequency to minimize variations in tool response due to skin effect. Thadani, et al. also disclose a deconvolution filter designed to compensate for skin effect, wherein the formation conductivity, as it varies from bed to bed, is modeled as a "staircase" conductivity profile expressed as a weighted linear combination of unit step functions. The deconvolution of the weighted linear unit step combination is constructed using a weighted linear combination of unit step function deconvolutions.

The methods of Schaefer, et al. and Thadani, et al., although improving upon the method of Moran, represent substantially linear, time-invariant approximations of the effect of variable formation conductivities. Like Moran, Schaefer, et al.'s approximation of the skin-effect attenuation is based on the quadrature-phase component signal. Schaefer, et al.'s method improves upon Moran's method by rendering it adaptive to variations between the quadrature-phase component of the receiver coil signal and the real component of the approximated skin-effect error signal. Even so, however, the method of Schaefer, et al. and that of Thadani, et al. do not account for attenuation of the electromagnetic field as it passes through formation material of varying conductivity and do not utilize a system response function that is truly responsive to nonlinear, time-variant changes in formation conductivity. Hence, it would be advantageous to provide a method for processing the output voltage signals from an induction log tool whereby the measured voltage signals are deconvolved with a sonde response function that can account for nonlinear variations in the measured output voltage signal as a consequence of a plurality of different formation conductivities within a predetermined zone surrounding the sonde.

SUMMARY OF THE INVENTION

Accordingly, there is provided herein an improved method for processing an output signal in a receiver coil of an induction logging tool, including the determination of a modified vertical geometrical factor (sonde response function) that varies nonlinearly with the conductivities of a plurality of sample intervals surrounding each measure point. The method includes for each measure point on an induction log, calculating a skin-effect corrected conductivity for each of a plurality of sample intervals of subsurface formation within a predetermined axial distance of the measure point, generating a modified vertical geometrical factor at each sample interval by attenuating the vertical geometrical factor for the tool by a factor that is a function of the distance in skin depths between the sample interval and the measure point, convolving the modified vertical geometrical factor at each sample interval with the corresponding skin-effect corrected conductivity, summing the convolutions from each sample interval to obtain a calculated approximation of the output signal at the measure point, and calculating an improved approximation of the true conductivity at the measure point as a function of the calculated approximation of the output signal and the skin-effect corrected conductivities of the sample intervals.

Alternatively, the present invention may be used in a post-processing application by substituting an iterative processing step for the single-pass calculation of an improved approximation of true conductivity. Thus, following summation of the convolutions from each sample interval, the calculated approximation of the output signal so obtained is compared to the actual measured value of the output signal. If the two values differ significantly, the skin-effect corrected conductivity for the measure point is changed incrementally. The method then is repeated for each succeeding measure point and iteratively for all measure points until the calculated approximation for the output signal converges on the measured value for the output signal. When the two values are substantially the same, the skin-effect corrected conductivity is an accurate approximation for the actual formation conductivity.

The method practiced in accordance with the principles of the present invention provides a sonde response function that varies nonlinearly with changes in conductivity within a predetermined zone that surrounds the measure point. By measuring the distance between each sample interval and the measure point in terms of skin depths, which is itself a function of formation conductivity, the sonde response function determined according to the present invention gives a more accurate assessment of the attenuation experienced by the electromagnetic field as it emanates from the tool to the sample interval and then back to the tool. The present method also accounts simultaneously for the problems of both shoulder effect and skin effect. These and various other characteristics and advantages of the present invention will become readily apparent to those skilled in the art upon reading the following detailed description and claims and by referring to the accompanying drawings.

BRIEF DESCRIPTION OF THE DRAWINGS

For a more detailed description of the preferred embodiment of the invention, reference will now be made to the accompanying drawings, wherein.

DESCRIPTION OF THE PREFERRED EMBODIMENT

Figure 1:
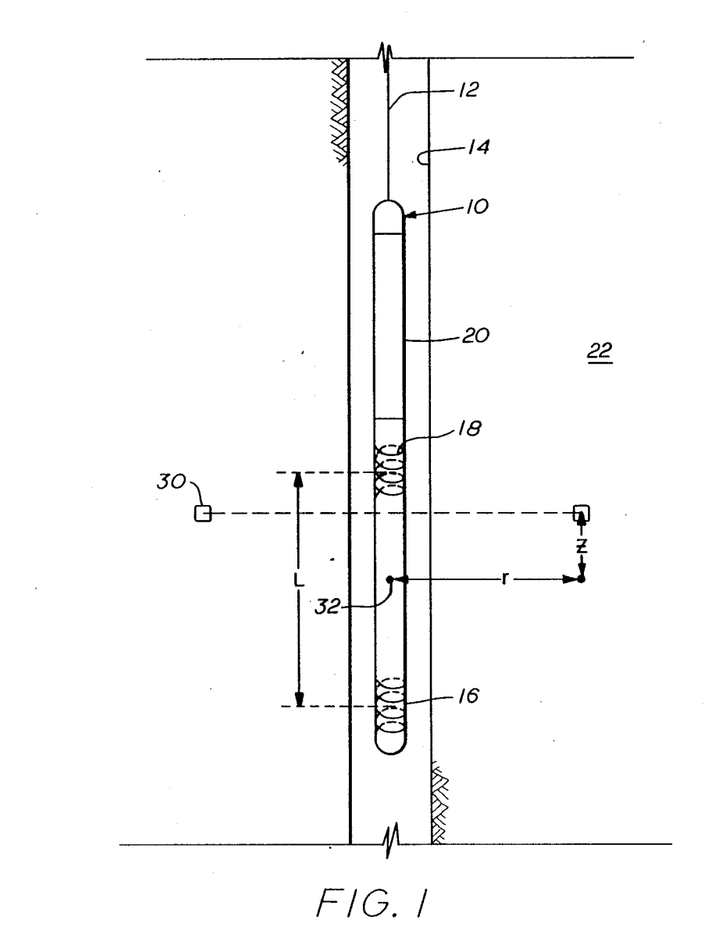
FIG. 1 depicts a schematic, partially cross-sectional representation of a typical induction logging tool suspended in a borehole in the earth.

Induction logging is a technique for measuring the resistivity, or its inverse, the conductivity, of subsurface formation material penetrated by a borehole. Conductivity of the formation material is one of several important characteristics used to identify the presence and position of hydrocarbons. FIG. 1 is a schematic representation of a simple, two-coil induction logging tool 10 suspended on a wireline cable 12 within a borehole 14, which, for ease of analysis, is assumed to be substantially vertical. The logging tool 10 includes a transmitter coil 16, a receiver coil 18, and a downhole electronics package 20. In operation, a transmitter housed within the electronics package 20 produces an alternating current of constant amplitude and frequency in the transmitter coil 16, thereby inducing a magnetic field in a generally horizontal formation bed 22 surrounding the borehole 14. The magnetic field penetrating the formation 22 induces therein eddy currents that flow circumferentially about the axis of the transmitter coil 16. The formation eddy currents, in turn, induce a magnetic field that is coupled to the receiver coil 18, causing a current to flow in the receiver coil 18. Because the signal in the receiver coil is related to the eddy current flow in a manner that can be calculated analytically, and because the eddy current flow is related to the conductivity of the formation in a manner that can be calculated analytically, the signal detected in the receiver coil can be processed to obtain an approximation of the conductivity of the formation.

Typically, the receiver coil signal is decoded with the downhole electronics package 20 to obtain an indication of the magnitude of that component of the signal that is in-phase with the transmitter coil signal and to obtain an indication of the magnitude of that component of the signal that is 90 degrees out of phase (in quadrature) with the transmitter coil signal. The in-phase component is often referred to as the R signal, and the quadrature phase component is often called the X signal.

To simplify the discussion herein, the present invention will be described in the context of the simple, two-coil sonde described above. It should be recognized, however, that the method described herein can be extrapolated to the more complex focused coil arrangements commonly used in the industry. It should also be noted that the general method as described below applies to either or both of medium induction coil arrays or deep induction coil arrays, with the particular differences, where pertinent, as noted below.

Two problems encountered in processing the signal induced in the receiver coil 18 are commonly referred to as the shoulder effect and the skin effect. The shoulder effect is a problem encountered in the area of transition between two beds of substantially different conductivity. Typically, eddy currents flowing in the bed of higher conductivity will skew the measured signal received from the bed of lesser conductivity, giving a false indication of conductivity within a transition area near the bed of higher conductivity. Skin effect is the attenuation and phase shift of the magnetic field induced in the formation with increasing conductivity. It is a function of the frequency of the transmitter current, the spacing of the transmitter and receiver coils (L in FIG. 1), and the conductivity of the formation. Skin effect causes the component of the receiver coil signal that is in-phase with the transmitter current to diminish nonlinearly with increasing conductivity. A number of prior art processing methods have attempted to compensate for skin effect by calculating an approximation of the skin effect based on the magnitude of the phase-shifted (X) component of the receiver coil signal, linearly filtering the X signal and adjusting its magnitude in response to variations in conductivity within the surrounding formation, and compensating the in-phase (R) component of the receiver coil signal by summing the adapted X signal component. Although these methods improve the accuracy of the resulting induction log, they fail to account for the nonlinear attenuation of the magnetic field generated by eddy currents spaced from the measure point as these fields traverse formation segments of varying conductivity.

In accordance with the principles of the present invention, there is provided herein a method for calculating the points on an induction log whereby the sonde response function is modified at each of a plurality of formation sample intervals for each measure point so as to account for the effect of the attenuation of that portion of the electromagnetic field at the measure point contributed by each formation sample interval as it traverse intervening intervals of varying conductivity. The sonde response function at each sample interval is modified in accordance with an attenuation factor that is a function of the number of skin depths between the sample interval and the measure point.

In practice, an induction logging tool is moved axially throughout the depth of a borehole to be logged, and the voltage in the receiver coil is sampled and recorded at predetermined, fixed intervals along the borehole axis. As data is collected at each sample point, two calculations are performed. First, the magnitude of the in-phase component of the recorded signal is modified by any of several techniques well-accepted in the art to correct for skin effect, so as to obtain an approximation for true formation conductivity in the interval of formation surrounding the sample point (the "sample interval"). Second, the skin depth, which is a measure of the rate of attenuation of the induced electromagnetic field propagating through the sample interval, is calculated.

When the sample point data has been collected throughout the depth of the borehole to be logged, the conductivity one would expect to measure at the first measure point in the borehole is calculated as the sum of the elementary conductivities contributed by each of a plurality of sample intervals for a fixed axial zone above and below the measure point. The elementary conductivity contributed by each sample interval within the predetermined zone is determined by convolving the skin-effect corrected conductivity for that interval with a modified sonde response function for that interval. The modified sonde response function for each sample interval is equal to the sonde response function for the logging tool at zero conductivity multiplied by an attenuation factor that is a function of the distance in skin depths between the sample interval and the measure point. The sum of the elementary conductivity contributions for each sample interval gives a calculated approximation for the signal recorded at the measure point. This approximation then is compared to the skin-effect corrected conductivity in the sample intervals nearest the measure point to obtain an improved approximation of true formation conductivity at the measure point. The foregoing procedure then is repeated for each succeeding measure point.

In an alternative embodiment of the present invention designed for use in processing the induction log data subsequent to the time the log data is recorded (as opposed to real-time processing as envisioned in the preferred embodiment), following calculation of the approximation for the recorded signal, the skin-effect corrected conductivity for each measure point is adjusted incrementally and the calculations are processed iteratively. If the skin-effect corrected conductivity for each formation interval is adjusted in small enough increments and in the correct direction, the calculated approximation for the recorded signal eventually will converge on the actual recorded signal, and a plot of the adjusted, skin-effect corrected conductivities will be an accurate approximation of the conductivity of the subsurface formations.

Referring more particularly now to the preferred embodiment, the method of the present invention is based on the geometrical factor theory of H. G. Doll, as expressed in his article, "Introduction to Induction Logging and Application to Logging of Wells Drilled With Oil Base Mud," published at pages 148–162 of the June 1949 issue of *Petroleum Transactions*. Those having ordinary skill in the art of induction log processing will be intimately familiar with Doll's geometrical factor theory. Doll defined a unit ground loop of formation as being a horizontal loop of homogeneous ground having a circular shape with its center on the axis of the borehole and having a very small, square cross section of unit area. FIG. 1 includes a schematic representation of a unit ground loop 30 depicted in cross section. The unit ground loop 30 has a radius r and an axial depth z measured with respect to the center 32 of the coil system. According to Doll, the unit ground loop 30 contributes an elementary voltage signal v to the in-phase component of the voltage signal induced in the receiver coil 18 given by the expression:

$$v = Kg\sigma \quad (1)$$

where $\sigma$ is the conductivity of the unit ground loop, K is a constant associated with the logging tool, and g is a factor that depends exclusively on the geometry of the unit ground loop. Thus, g, the geometrical factor, is a function of the variables r and z.

If all unit ground loops lying within the same horizontal plane are assumed to have the same conductivity, an assumption that is reasonable if the formation beds are generally horizontal and invasion by drilling mud is negligible, then the geometrical factor g can be integrated over all r to obtain an expression for the geometrical factor solely as a function of z:

$$g(z) = \int_0^\infty g(z, r) \, dr \quad (2)$$

This latter expression for the geometrical factor, the function g(z), is sometimes referred to as the vertical geometrical factor for the tool. The vertical geometrical factor is the sonde response function at zero conductivity; that is, when convolved with true formation conductivity, it gives an expression for the measured conductivity, $\sigma_M$, assuming little or no loss in the receiver coil signal as a consequence of skin effect attenuation in the formation:

$$\sigma_M = \int_{-\infty}^{+\infty} g(z - z') \, \sigma_F(z') \, dz' \quad (3)$$

Thus, if the measured receiver coil signal received at a particular depth in the borehole is deconvolved using an accurate characterization of the sonde response function, the result will be the true formation conductivity.

Figure 2:
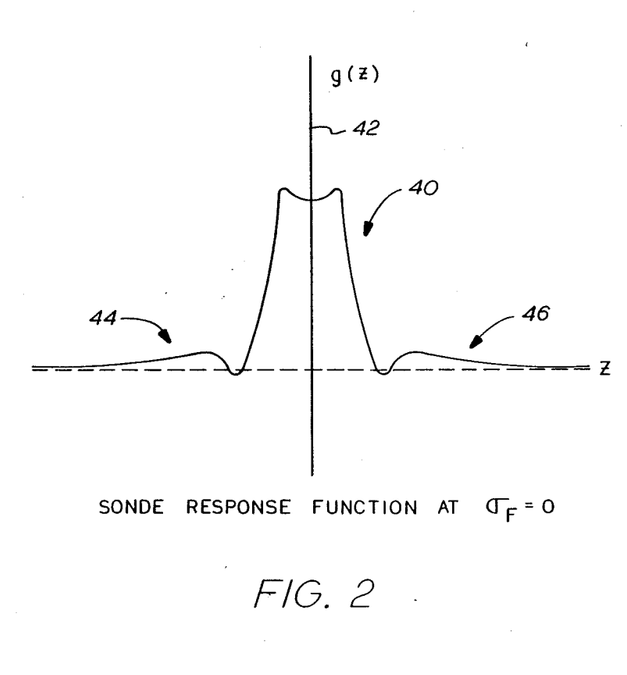
FIG. 2 depicts a plot of a typical vertical geometrical factor, $g(z)$, as a function of axial depth, z.

FIG. 2 depicts the sonde response function at zero conductivity, also called the vertical geometrical factor, for a typical deep induction sonde plotted as a function of axial distance from the center of the sonde coil system. As shown in FIG. 2, the typical vertical geometrical factor g(z) is characterized by a main lobe or "near region" 40 centered about the center point 42 of the sonde. The near region 40 diminishes with axial distance z on both sides of the center point 42 of the tool to define a pair of wing regions 44, 46 where the vertical geometrical factor g(z) gradually diminishes to a point that is spaced axially so far from the sonde that it does not contribute appreciably to the voltage induced in the receiver coil. The sonde response function for a typical medium induction sonde is asymmetric about the center point of the tool, but nonetheless can be characterized also as having a near region of higher sensitivity flanked by wing regions of lesser and diminishing sensitivity.

Figure 3:
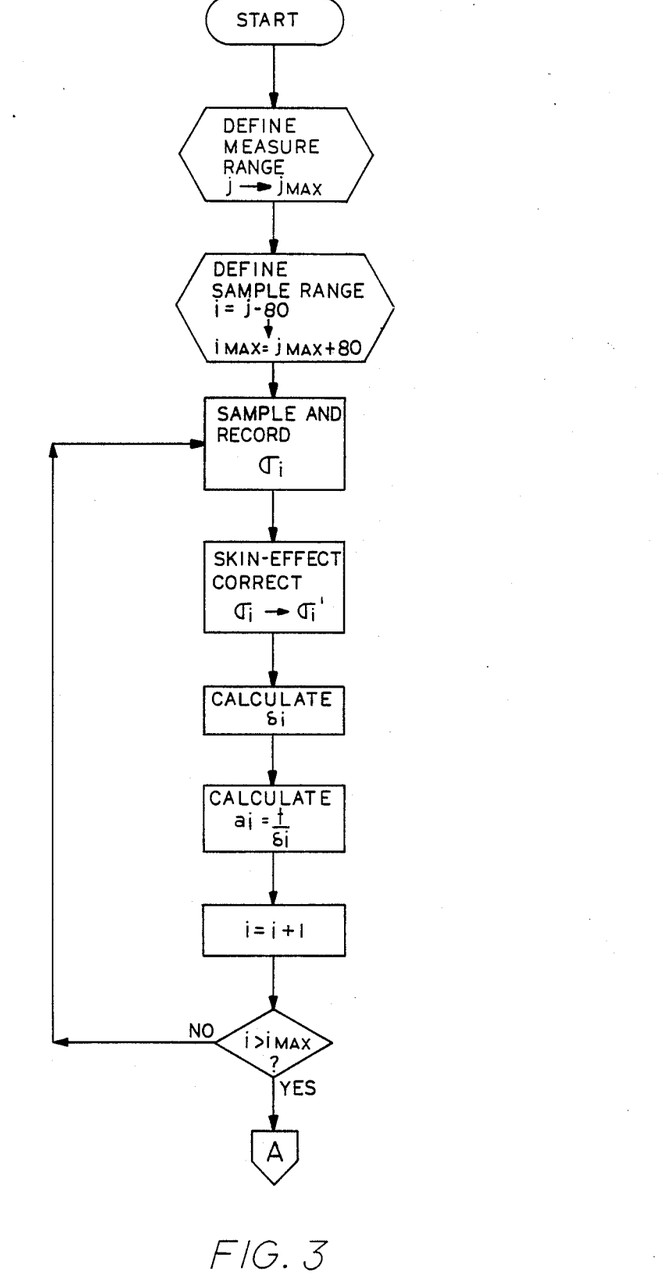
FIG. 3 depicts a flow chart for a portion of the preferred embodiment of a method practiced in accordance with the principles of the present invention.

Referring now to the flow chart depicted in FIG. 3, the processing method practiced in accordance with the principles of the present invention commences by sampling and recording the in-phase (R) component and the quadrature-phase (X) component of the voltage signal induced in the receiver coil of the sonde at fixed sample points along the axis of a borehole. The sample points may be spaced, for example, every three inches, along the borehole axis for a predefined span of the borehole depth, thereby defining a sample interval of formation material comprising a generally horizontally positioned, circular plate of infinite radius having an axial thickness of three inches spaced equally about the sample point.

Figure 4:
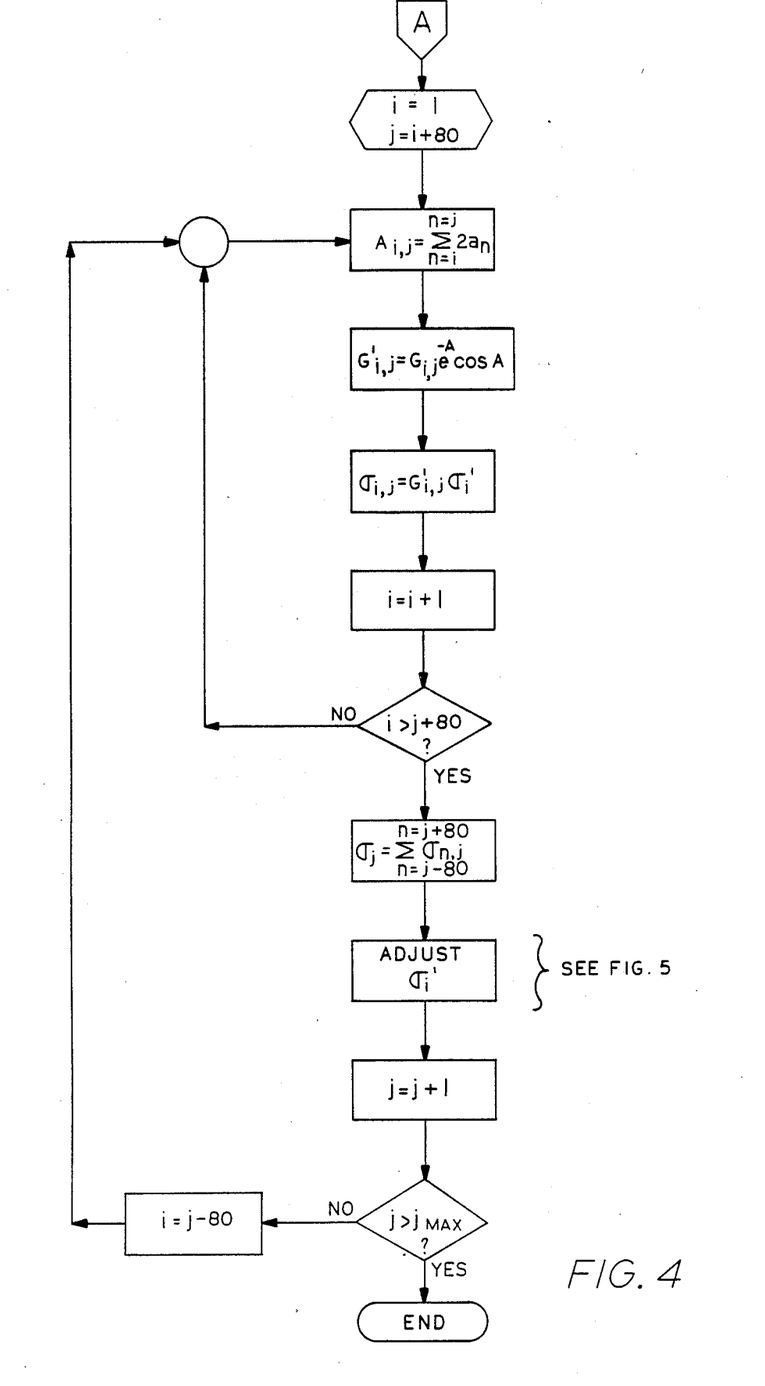
FIG. 4 depicts a flow chart that connects with the flow chart depicted in FIG. 3 to show in combination the preferred embodiment of the method practiced in accordance with the principles of the present invention.
Figure 5:
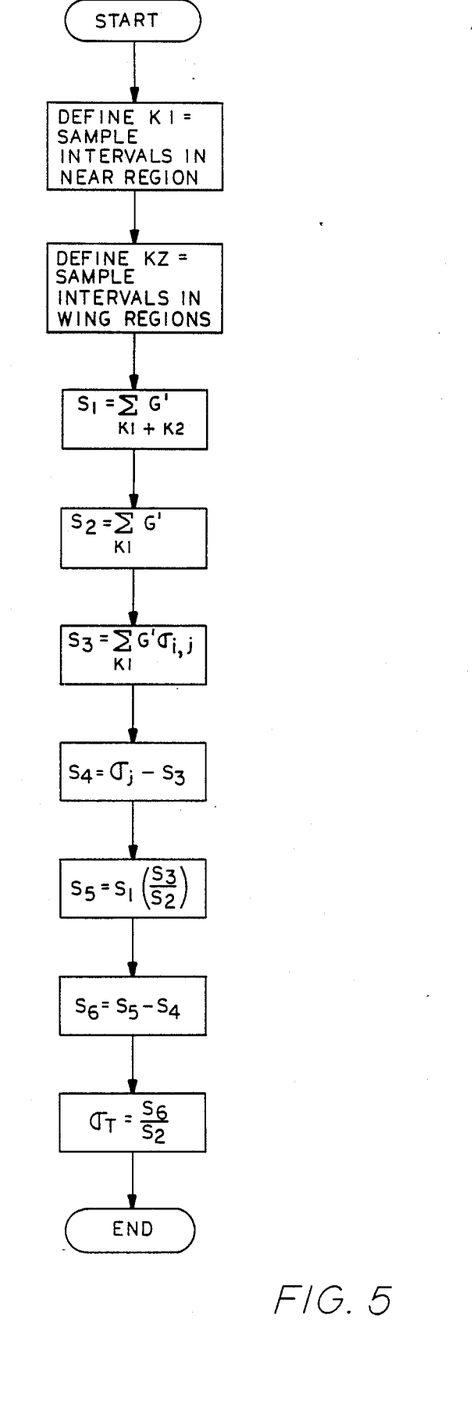
FIG. 5 depicts a flow chart expansion of one of the steps indicated in the flow chart depicted in FIG. 4.

Because the present method contemplates the use of sample data taken from a range of sample intervals, for example 20 feet (or 80 sample intervals of three inches each), above and below each measure point in order to calculate conductivity at the measure point, it is necessary that sample points be taken throughout a range of the borehole that commences at least 20 feet above and continues at least 20 feet beyond the axial range of the borehole for which an induction log is desired. All discussions below and in the flow charts depicted in FIGS. 3, 4, and 5 are based upon the assumption that each sample interval is three inches thick and that a sample zone of 161 sample intervals is used in the approximation of the actual formation conductivity. It will be appreciated by those skilled in the art, however, that the particular thickness used for a sample interval (i.e., the spacing between sample points) and the magnitude of the zone of sample intervals considered in connection with each measure point may vary without departing from the principles of the invention.

As the receiver coil data is decoded and recorded at each sample point, two separate calculations are made: the skin-effect corrected conductivity for each sample interval and the thickness of the sample interval as measured in skin depths. It will be recognized by those skilled in the art that the timing of these calculations, and in particular whether or not these calculations are made as the sample data is collected, is not of critical importance to the present invention. Because the present invention is primarily intended for use in real-time induction log processing, however, and because the present invention contemplates a significant amount of data processing, it is preferred that efficient use be made of the processing electronics at all times, and accordingly, that these calculations be made as the sample data is collected.

The skin-effect corrected conductivity $\sigma_i'$ may be calculated by any of several techniques well-known in the art using only the in-phase component of the receiver coil signal, or as is preferred herein, using both the in-phase component and the quadrature-phase component of the receiver coil signal, to obtain an approximation of true formation conductivity within each successive sample interval. One technique, for example well known in the art for estimating by use of the quadrature-phase component the attenuation of the in-phase component due to skin effect is disclosed in U.S. Pat. No. 3,147,429, which is expressly incorporated herein by reference. Other techniques may be used as well without departing from the principles or the present invention. It will be apparent to those having ordinary skill in the art that the method disclosed herein should be practiced with the most accurate skin-effect correction technique that can reasonably be applied under the circumstances.

The second calculation at each sample point relates to skin depth. Skin depth is a measure of the rate of attenuation of an electromagnetic wave within a conductor and, in particular, is the distance over which the wave will travel while being attenuated by a factor of 1/e. It is given by the expression:

$$\delta_i = \left(\frac{2}{\omega\mu\sigma_i'}\right)^{0.5} \tag{4}$$

where $\omega$ is the angular frequency in radians of the transmitter coil signal, $\mu$ is a constant, the magnetic permeability of the formation material, and $\sigma_i'$ is the skin-effect corrected conductivity for the sample interval, as previously calculated. Equation 4 yields a result in units of length. If the skin depth then is divided into the thickness of the sample interval, t, the result is a measure of the thickness of the sample interval in terms of skin depths:

$$a_i = \frac{t}{\delta_i} \tag{5}$$

Thus, Equation 5 is an expression for sample interval thickness in terms of the number of skin depths, or fraction thereof, encountered by an electromagnetic wave traversing the sample interval. The result, $a_i$, varies with the square root of conductivity. As the conductivity of the formation sample interval increases, the attenuation and phase shift of the electromagnetic wave within the sample interval increases, and $a_i$, a measure of attenuation, also increases. The present invention uses the $a_i$ calculated for each sample interval to modify at each sample interval the sonde response function for each measure point so as to account for attenuation of the magnetic field contributed at each measure point by eddy currents flowing in outlying sample intervals.

As shown by the flow chart depicted in FIG. 3, the foregoing sample and calculation procedure continues at each successive sample interval for the range of the borehole under examination. Once data has been collected at each sample point, processing of the data may proceed as described below to obtain an accurate approximation of the true formation conductivity at each measure point.

Referring now to the flow chart shown in FIG. 4, the next step in the present method commences at the first measure point (j=81) and calculates the total distance $A_{i,j}$ in skin depths traversed by an electromagnetic wave as it propagates from the measure point to the farthest applicable sample interval (i=1) above (or below, depending on the frame of reference) the measure point:

$$A_{i,j} = \sum_{n=i}^{n=j} 2 a_n \tag{6}$$

where $a_n$ is the thickness in skin depths of each sample interval, as calculated in Equation 5. Each sample interval thickness between the applicable sample interval (i=1) and the measure point (j=81) is doubled in Equation 6 to account for propagation effects in traversing the interval approximately twice—once as the magnetic field emanates from the transmitter coil to induce an eddy current in the applicable sample interval and a second time as the magnetic field induced by the eddy current propagates to the receiver coil.

After the distance $A_{i,j}$ in skin depths between the applicable sample interval (i=1) and the measure point (j=81) has been calculated, the distance $A_{i,j}$ is used to determine an attenuation factor to be applied to the vertical geometrical factor $G_{i,j}$ for the sonde at the measure point. The attenuation factor, $$e^{-A} \cos A \tag{7}$$

has been found to provide an approximation of the nonlinear attenuation of the vertical geometrical factor with variations in formation conductivity. Applying the attenuation factor to the vertical geometrical factor gives:

$$G_{i,j}' = G_{i,j}(e^{-A} \cos A) \tag{8}$$

where $G_{i,j}'$ is the portion of the modified vertical geometrical factor for the measure point (j=i+80=81) attributable to the applicable sample interval (i=1).

Referring still to the flow chart shown in FIG. 4, the modified geometrical factor $G_{i,j}'$ next is applied to the skin-effect corrected conductivity $\sigma_i'$ for the applicable sample interval to determine the elementary signal $o_{i,j}$ contributed by the applicable sample interval at the measure point:

$$\sigma_{i,j} = G_{i,j}' \sigma_i' \tag{9}$$

The foregoing procedure, commencing with calculation of $A_{i,j}$ then is repeated for each succeeding sample interval within the applicable sample zone for the measure point until the elementary signal $\sigma_{i,j}$ contributed by each of 161 consecutive sample intervals for the first measure point (20 feet above and below the measure point) has been determined. Thereafter, an approximation for the conductivity measured in the receiver coil at the measure point is calculated by summing the elementary signals at each of the 161 sample intervals:

$$\sigma_j = \sum_{n=j-80}^{n=j+80} \sigma_{n,j} \quad (10)$$

It will be appreciated by one having ordinary skill in the art that one may vary the foregoing portion of the method described herein without departing from the principles or the present invention. For example, in the wing regions of the response function where the elementary signal contribution $\sigma_{i,j}$ are relatively minimal in magnitude, one may enhance the speed of the calculation without substantially distorting the resulting approximation by calculating the elementary signal contribution $\sigma_{i,j}$ for every other sample interval and then doubling the result. This procedure, in effect, spreads the sample points (or increases the depth of the sample intervals) within the area of the formation that has a substantially lesser influence over the signal detected at the measure point and thereby increases the efficiency of the method as applied by a digital processor.

If the skin-effect corrected conductivity $\sigma_i'$ used for each sample interval is an accurate approximation for the true formation conductivity within the sample interval, then the calculated approximation for the measured signal from Equation 10 will be substantially identical to the recorded signal measured in the receiver coil at the measure point. If there is a difference between the calculated approximation and the measured signal, then it can be concluded that the skin-effect corrected conductivity at the measure point differs from the true formation conductivity, and the magnitude of the difference can be approximated in a manner that will permit adjustment of the approximated in a manner that will permit adjustment of the skin-effect corrected conductivity to better approximate the true formation conductivity.

There is disclosed herein as a part of the preferred embodiment of the invention a method for adjusting the skin-effect corrected conductivity to obtain a more accurate approximation of true formation conductivity in a real-time log processing application. It is anticipated, however, that any number of solutions to the adjustment problem, each of varying complexity, may exist. Accordingly, although the preferred embodiment of the adjustment method is disclosed herein, there may exist various improved embodiments of the adjustment method that fall within the principles of the present invention.

The adjustment method disclosed herein relies for its operation on a distinction between those sample intervals that fall within the near region of the vertical geometrical factor and those that fall within one of the two wing regions. Referring again briefly to FIG. 2, it will be recalled that a plot of the typical vertical geometrical factor for a deep induction sonde as a function of axial depth may be divided into a near region 40, defining the portions of the formation at which the sonde is particularly sensitive to formation conductivity, and a pair of wing regions 44,46, defining the portions of the formation at which the sonde is significantly less responsive to formation conductivity. By comparing the magnitudes of the relative contributions of the near region and the wing regions, using the original skin-effect corrected conductivities, to the approximation of the signal calculated at the measure point, it is possible to derive a method for calculating an approximation for the magnitude of the difference between the skin-effect corrected conductivity and the true formation conductivity at the measure point.

Referring now to FIG. 5, the first step in calculating an adjusted value for formation conductivity is to define the set $K_1$ of all sample intervals that lie within the near region of the modified vertical geometrical factor $G_{i,j}'$ for the measure point. This may be accomplished, for example, by determining the axial positions $z_c$ on each side of the center point of the tool at which the modified vertical geometrical factor $G_{i,j}'$ first equals zero. It may be said that the set $K_1$ will not exceed the region between the two axial positions $z_c$. One having ordinary skill in the art will appreciate, however, that it may be necessary, based on the analysis of empirical data for a particular sonde, to adjust the set $K_1$ to be less inclusive so as to obtain a more accurate approximation according to the method disclosed herein. All sample intervals not within $K_1$ so-defined are by definition a part of the set $K_2$ of sample intervals lying within one of the two wing regions. The axial positions $z_c$ defining the sets $K_1$ and $K_2$ may be modified as necessary to obtain a more accurate adjustment to the calculated conductivity.

The second step of the adjustment method is the calculation, in no particular order, of three subsidiary sums, hereinafter designated $S_1$, $S_2$, and $S_3$.

$$S_1 = \sum_{K_1 + K_2} G_{i,j}' \quad (11)$$

$$S_2 = \sum_{K_1} G_{i,j}' \quad (12)$$

$$S_3 = \sum_{K_1} G_{i,j}' \sigma_{i,j} \quad (13)$$

$S_3$ is an expression for the portion of the calculated approximation of the recorded signal at the measure point attributable to the near region of the formation. Thus, if $$S_4 = \sigma_j - S_3 \quad (14)$$

where $\sigma_j$ is the calculated approximation of the recorded signal from Equation 10, then $S_4$ is an expression for the portion of the calculated approximation attributable to the wing regions of the formation, assuming the skin-effect corrected conductivity is an accurate approximation of true formation conductivity. Letting $$S_5 = S_1 \left( \frac{S_3}{S_2} \right) \quad (15)$$

The quantity $S_3/S_2$ can be interpreted as the average elementary signal contributed per sample interval in the near region. When this quantity is multiplied by the sum $S_1$ of all modified vertical geometrical factors, the result $S_5$ is the theoretical conductivity signal in the receiver coil of the sonde assuming that the average conductivity in the near region, $S_3/S_2$, is the conductivity over the entire region. Thus, if $$S_6 = S_5 - S_4 \quad (16)$$

the result $S_6$ is an adjusted expression for the portion of the measured conductivity signal in the receiver coil of the sonde attributable to the near region. If $S_6$ then is divided by $S_2$, the sum of the modified vertical geometrical factors over the near region, the result is an adjusted approximation for true formation conductivity at the measure point:

$$\sigma_T = \frac{S_6}{S_2} \quad (17)$$

If the true formation conductivity in the wing regions is greater than that of the near region, the adjusted approximation $\sigma_T$, will be less than the skin-effect corrected conductivity $\sigma_i'$ originally assumed to have been an accurate approximation of formation conductivity at the measure point. If the true formation conductivity in the wing regions is less than that of the near region, $\sigma_T$ will be greater than the skin-effect corrected conductivity $\sigma_i'$.

After calculating an improved approximation for true formation conductivity at the first measure point, the entire method, commencing at Equation 6 supra, is repeated for each succeeding measure point, giving a complete induction log for the desired range of borehole depth. It will be appreciated by those having ordinary skill in the art that certain portions of the method described above, including the calculation of an adjustment to the skin-effect corrected conductivity at each measure point, can be performed at a time or in an order different from that disclosed herein without departing from the principles of the present invention.

The present invention, in an alternative embodiment, may be used in a post-processing application. The alternative embodiment of the present method would be identical to the method described supra up to and including the calculation in Equation 10 of an approximation for the signal measured in the receiver coil. Rather than proceeding from that point with the method described above for adjusting the skin-effect corrected conductivity in a single approximation, as described in the flow chart shown in FIG. 5, to obtain a more accurate approximation of true formation conductivity, the alternative embodiment of the invention includes an incremental adjustment of the skin-effect corrected conductivity at each measure point followed by a repetition of the entire method to obtain a different approximation for the signal measured in the receiver coil. If the skin-effect corrected conductivity is adjusted incrementally in the proper direction, according to the difference between the calculated approximation for the measured signal and the magnitude of the measured signal itself, and the method is repeated iteratively, then the calculated approximation for the measured signal should converge on the actual measured signal. When the calculated approximation is substantially equal to the measured value, then the skin-effect corrected conductivity for the measure point represents an accurate approximation of the true conductivity of the formation.

Referring again to the preferred embodiment of the invention, the construction of the logging tool and the programming of a digital computer to carry out the method disclosed herein is well within the ability of one having ordinary skill in the art of induction log processing. One having such skill will appreciate that the foregoing description of attributes and advantages to be experienced by use of the method disclosed herein is not exhaustive of all features of the present invention. It will also be appreciated that modifications for the aforedescribed preferred and alternative embodiments of the inventive method can be made without departing in substance from the principles of the invention.

What is claimed is:

1. A method for making an induction log, comprising:
   (a) providing an induction logging tool having a vertical geometrical factor, at least one transmitter coil, and at least one receiver coil;
   (b) suspending the logging tool in a borehole;
   (c) generating an electrical signal in the transmitter coil, whereby an electrical signal is induced in the receiver coil;
   (d) moving the logging tool axially through the borehole and measuring the electrical signal in the receiver coil at each of a plurality of predetermined sample points within the borehole;
   (e) calculating a skin-effect corrected conductivity at each sample point;
   (f) selecting from said plurality of sample point within the borehole a measure point and a set of sample points;
      (f)(1) for each selected sample point, generating a modified vertical geometrical factor as a function of distance in skin depths between the sample point and the measure point;
      (f)(2) convolving at each selected sample point the modified geometrical factor generated in said step (f)(1) with the skin-effect corrected conductivity calculated in said step (e) to obtain an approximation for each sample point of an elementary electrical signal contributed by the sample point at the measure point;
      (f)(3) summing the approximations obtained according to step (f)(2) to obtain an approximation of the electrical signal measured at the measure point;
      (f)(4) calculating an approximation for true conductivity at the measure point as a function of the sum obtained in said step (f)(3); and
   (g) repeating said step (f) for a plurality of measure points to obtain a log of formation conductivity as a function of borehole depth.

2. A method according to claim 1, wherein said step (f)(1) of generating a modified vertical geometrical factor comprises multiplying the vertical geometrical factor for the tool by an attenuation factor that is a function of the distance in skin depths between the sample point and the measure point.

3. A method according to claim 2, wherein the attenuation factor is inversely proportional to $e^A$, where the magnitude of the variable A is directly proportional to the distance in skin depths between the sample point and the measure point.

4. A method according to claim 2, wherein the attenuation factor is directly proportional to cos A, where the magnitude of the variable A is directly proportional to the distance in skin depths between the sample point and the measure point.

5. A method according to claim 2, wherein the attenuation factor is directly proportional to $e^{-A} \cos A$, where the magnitude of the variable A is directly proportional to the distance in skin depths between the sample point and the measure point.

6. A method according to claim 2, wherein the attenuation factor equals $e^{-A} \cos A$, where the variable A is equal to twice the distance in skin depths between the sample point and measure point.

7. A method according to claim 1, wherein said calculating in step (f)(4) comprises:

(f)(4)(i) comparing the sum obtained in said step (f)(3) with the measured electrical signal at the measure point; and (f)(4)(ii) if the sum obtained in step (f)(3) differs from the measured electrical signal recorded at the measure point, calculating an improved approximation of true formation conductivity.

8. A method according to claim 1, wherein the calculating in said step (f)(4) comprises the steps of:

(f)(4)(i) incrementally changing the magnitude of the skin-effect corrected conductivity calculated in said step (e) for the measure point;

(f)(4)(ii) repeating said steps (f)(1) through (f)(3);

(f)(4)(iii) comparing the sum obtained in said step (f)(3) with the electrical signal measured at the measure point; and (f)(4)(iv) repeating said steps (f)(4)(i) through (f)(4)(iii) until the sum obtained in said step (f)(3) approximately converges on the electrical signal measured at the measure point.

9. A method for processing the voltage signals in a receiver coil of an induction sonde suspended in a borehole to obtain a log of the conductivity of subsurface formation material surrounding the borehole, the sonde having a predetermined response function, said method comprising the steps of:

(a) recording a receiver coil voltage signal at each of a plurality of sample intervals along the axis of the borehole;

(b) calculating for each sample interval a skin-effect corrected conductivity from said receiver coil voltage signal recorded in said step (a);

(c) selecting a measure point from among the sample intervals;

(c)(1) identifying for the measure point selected in said step (c) a plurality of sample intervals within a predetermined axial distance of the measure point;

(c)(2) for each sample interval identified in said step (c)(1), modifying the sonde response function for the measure point as a function of distance in skin depths between the sample interval and the measure point;

(c)(3) for each sample interval identified in said step (c)(1), convolving the modified sonde response function from said step (c)(2) with the skin-effect corrected conductivity calculated for the sample intervals in said step (b) to obtain an approximation for each sample interval of an elementary voltage signal contributed by the sample interval at the measure point;

(c)(4) summing the approximations obtained in said step (c)(3) for all sample intervals identified in said step (c)(1) to obtain an approximation of the receiver coil voltage signal recorded at the measure point;

(c)(5) calculating an approximation for true formation conductivity at the measure point as a function of the sum obtained in said step (c)(4); and (d) repeating said step (c) for a plurality of measure points to obtain a log of formation conductivity as a function of borehole depth.

10. A method according to claim 9 wherein said step (a) includes the step of detecting for each recorded voltage an in-phase component and a quadrature-phase component; and wherein said step (b) comprises adjusting the magnitude of the in-phase component of the receiver coil voltages a function of the magnitude of the quadrature-phase component of the receiver coil voltage to obtain a skin-effect corrected conductivity for each sample interval.

11. A method according to claim 9, wherein the predetermined axial distance used in said step (c)(1) comprises a zone of substantially all formation material within which eddy currents induced by a sonde positioned at the measure point will influence the receiver coil voltage signal.

12. A method according to claim 9, wherein said step (c)(2) of modifying the sonde response function comprises attenuating the sonde response function by a factor that is inversely proportional to $e^A$, where the magnitude of the variable A is directly proportional to the distance in skin depths between the sample interval and the measure point.

13. A method according to claim 9, wherein said step (c)(2) of modifying the sonde response function comprises attenuating the sonde response function by a factor that is directly proportional to cos A, where the magnitude of the variable A is directly proportional to the distance in skin depths between the sample interval and the measure point.

14. A method according to claim 9, wherein said step (c)(2) of modifying the sonde response function comprises attenuating the sonde response function by a factor that is inversely proportional to $e^A$ and directly proportional to cos A, where the magnitude of the variable A is directly proportional to the distance in skin depths between the sample interval and the measure point.

15. A method according to claim 9, wherein said step (c)(2) of modifying the sonde response function comprises attenuating the sonde response function by a factor that is equal to $e^{-A} \cos A$, where the variable A is equal to two times the distance in skin depths between the sample interval and the measure point.

16. A method according to claim 9, wherein said step (c)(5) comprises calculating an approximation for true formation conductivity at the measure point as a function of the skin-effect corrected conductivities calculated in said step (b) and the sum obtained in step (c)(4).

17. A method according to claim 9, wherein said step (c)(5) comprises adjusting the skin-effect corrected conductivity calculated in said step (b) at the measure point by an incremental change; and further comprising the step of: (e) repeating said steps (c) and (d) until the sum obtained in said step (c)(4) converges approximately on the receiver coil voltage recorded in said step (a) for each measure point.

18. A method for making an induction log, comprising:

(a) providing an induction logging tool having at least one transmitter coil and at least one receiver coil;

(b) suspending the logging tool in a borehole;

(c) generating an electrical signal in the transmitter coil, whereby an electrical signal is induced in the receiver coil;

(d) identifying a plurality of sample points at predetermined intervals along the axis of the borehole;

(e) moving the logging tool axially through the borehole to a sample point;

(e)(1) measuring and recording the electrical signal in the receiver coil at the sample point;

(e)(2) calculating a skin-effect corrected conductivity at the sample point;
(f) selecting a measure point within the borehole and a set of sample points;
  (f)(1) for each selected sample point, generating a modified vertical geometrical factor as a function of distance in skin depths between the sample point and the measure point;
  (f)(2) convolving at each selected sample point the modified geometrical factor generated in said step (f)(1) with the skin-effect conductivity calculated in said step (e)(2) to obtain an approximation for each sample point of an elementary electrical signal contributed by the sample point at the measure point;
  (f)(3) summing the approximations obtained according to step (f)(2) to obtain an approximation of the electrical signal recorded in the receiver coil at the measure point;
  (f)(4) calculating an approximation for true conductivity at the measure point as a function of the sum obtained in said step (f)(3); and
(g) repeating said step (f) for a plurality of measure points to obtain a log of formation conductivity as a function of borehole depth.

19. Induction logging apparatus, comprising:
an induction logging tool having at least one transmitter coil and at least one receiver coil;
means for suspending said logging tool in a borehole;
means for generating an electrical signal in the transmitter coil, whereby an electrical signal is induced in the receiver coil;
means for moving the logging tool axially through the borehole;
means for measuring the electrical signal in the receiver coil at each of a plurality of sample points within the borehole;
means for calculating from the electrical signals measured in the receiver coil a skin-effect corrected conductivity at each of the plurality of sample points;
means for selecting a measure point and a set of sample points;
means for generating at each sample point from the set of sample points a modified vertical geometrical factor as a function of distance in skin depths between the sample point and the measure point;
means for convolving at each sample point from the set of sample points the modified geometrical factor from said generating means with the skin-effect corrected conductivity from said calculating means to obtain an approximation for each sample point of an elementary electrical signal contributed by each sample point at the measure point;
means for summing the approximations from said convolving means for each sample point to obtain an approximation of the electrical signal measured in the receiver coil at the measure point;
means for calculating an improved approximation of the true conductivity at the measure point based on the sum from said summing means;
means for causing said selecting means, generating means, convolving means, summing means, and calculating means to operate repetitively to produce approximations of true conductivity at a plurality of measure points; and
means for plotting approximations from said calculating means in the form of an induction log.

20. Induction logging apparatus, comprising:
an induction logging tool having at least one transmitter coil and at least one receiver coil;
means for generating an electrical signal in the transmitter coil, whereby an electrical signal is induced in the receiver coil;
means for measuring the electrical signal in the receiver coil at each of a plurality of predetermined sample points within a borehole; and
means for processing the electrical signals measured in the receiver coil, said processing means including
  means for calculating from the electrical signals measured in the receiver coil a skin-effect corrected conductivity at each sample point from the plurality of predetermined sample points,
  means for selecting a measure point and a set of sample points within the borehole,
  means for generating a modified vertical geometrical factor as a function of distance in skin depths between the measure point and each sample point from the set of sample points,
  means for convolving at each sample point from the set of sample points the modified geometrical factor from said generating means with the skin-effect corrected conductivity from said calculating means to obtain an approximation for each sample point of an elementary electrical signal contributed by the sample point at the measure point,
  means for summing the approximations from said convolving means for each sample point to obtain an approximation of the electrical signal measured at the measure point, and
  means for calculating an approximation for true conductivity at the measure point as a function of the sum from said summing means;
means for operating said processing means repetitively to obtain approximations of true conductivity at a plurality of measure points; and
means for producing an induction log based on the approximations of true conductivity from said processing means.

* * * * *